United States Patent
Rebsdorf et al.

(10) Patent No.: US 8,087,888 B2
(45) Date of Patent: Jan. 3, 2012

(54) WIND TURBINE BLADE WITH CAMBERING FLAPS

(75) Inventors: Anders Rebsdorf, Silkeborg (DK);
Michael Friedrich, Silkeborg (DK);
Christian Meldgaard, Silkeborg (DK)

(73) Assignee: Gamesa Innovation & Technology, S.L., Sarriguren, Navarra (ES)

( * ) Notice: Subject to any disclaimer, the term of this patent is extended or adjusted under 35 U.S.C. 154(b) by 860 days.

(21) Appl. No.: 12/144,812

(22) Filed: Jun. 24, 2008

(65) Prior Publication Data

US 2009/0028704 A1    Jan. 29, 2009

(30) Foreign Application Priority Data

Jul. 23, 2007   (ES) .................................. 200702050

(51) Int. Cl.
*B64C 27/615*    (2006.01)
(52) U.S. Cl. .......................................................... 416/23
(58) Field of Classification Search ................ 416/9–17, 416/23–25
See application file for complete search history.

(56) References Cited

U.S. PATENT DOCUMENTS

| 5,375,324 | A | * | 12/1994 | Wallace et al. | 29/889.21 |
| 5,456,579 | A | * | 10/1995 | Olson | 416/23 |
| 6,015,115 | A | * | 1/2000 | Dorsett et al. | 244/219 |
| 6,347,769 | B1 | * | 2/2002 | To et al. | 244/219 |
| 7,059,833 | B2 | * | 6/2006 | Stiesdal et al. | 416/41 |
| 2007/0036653 | A1 | * | 2/2007 | Bak et al. | 416/98 |

* cited by examiner

*Primary Examiner* — Matthew W Such
(74) *Attorney, Agent, or Firm* — Ladas & Parry LLP

(57) ABSTRACT

A wind turbine having at least a blade comprising a first component (11) having an aerodynamic profile with a leading edge (5), a trailing edge (7) and suction and pressure sides between the leading edge (5) and the trailing edge (7) and a second component (13) attached to the trailing edge (7) and/or to the leading edge (5) of the first component (11) in at least a part of the blade, in which the second component (13) comprises an upwards and/or downwards deflectable flap (15) that allows changing the flow over the blade and in which the means for deflecting the flap (15) comprise a stiff plate (31) inserted between the first component (11) and the flap (15) and stiff plate actuating means (33, 43).

13 Claims, 2 Drawing Sheets

US 8,087,888 B2

WIND TURBINE BLADE WITH CAMBERING FLAPS

FIELD OF THE INVENTION

The invention relates to a wind turbine having rotor blades with cambering/deflectable flap s and in particular to rotor blades with deflectable flaps for optimizing the blade loads.

BACKGROUND

Wind turbines are devices that convert mechanical energy to electrical energy. A typical wind turbine includes a nacelle mounted on a tower housing a drive train for transmitting the rotation of a rotor to an electric generator.

The efficiency of a wind turbine depends on many factors. One of them is the orientation of the rotor blades with respect to the direction of the air stream, which is usually controlled by a pitch system that allows adjusting the pitch angle of the rotor blades for maintaining the rotor's speed at a constant value or within a given range. Otherwise, specially at high wind speeds, the load of the rotor will exceed the limits set by the wind turbine's structural strength.

There are two basic methods for controlling the power of a wind turbine changing the pitch angle of the rotor blades: the "pitch" control method and the "stall" control method.

In the "pitch" control method the rotor blade's pitch angle is changed to a smaller angle of attack in order to reduce power capture and to a greater angle of attack to increase the power capture. This method allows a sensitive and stable control of the aerodynamic power capture and rotor speed.

In the "stall" control method the rotor blade's pitch angle is changed to a greater angle of attack to the point where the flow separates at the rotor blade's surface, thus limiting the aerodynamic power capture.

The pitch regulated wind turbines can also use the pitch system to reduce the dynamic loads, either by cyclic pitch or by individual blade pitch. However, for large wind turbine blades it can be difficult to control the blade loading as the blade loading can vary over the blade length. As the rotor size is increasing, the pitching of the blades not necessarily provides an optimized loading along the whole blade because nor only wind shear, yaw errors and gust will affect the flow on the blade, but different gusts can hit the blade simultaneously or complex wind shear profiles with negative wind shear can occur.

In addition to the use of the pitch system there are known in the prior art some proposals in the prior art for optimizing the blade loads.

One known proposal is the use of small control surfaces such as Gurney flaps attached to the trailing edge for optimizing the blade loads. One disadvantage of Gurney flaps is the increase in aerodynamic noise from the free ends of the Gurney flaps and from the gaps in the blade where the Gurney flap is positioned.

Another known proposals are addressed to control the aerodynamic forces along the rotor blades by a continuous variation of the airfoil geometry in the leading edge region and trailing edge region along part of or along the whole blade span.

One of these proposals, disclosed in WO 2004/088130, relates to a design concept by which the power, loads and/or stability of a wind turbine may be controlled by a fast variation of the geometry of the blades using active geometry control (e.g. smart materials or by embedded mechanical actuators), or using passive geometry control (e.g. changes arising from loading and/or deformation of the blade) or by a combination of the two methods. In one preferred embodiment piezoelectric plates are to built in the trailing edge over part of the blade for modifying its geometry in order to reduce the blade loads. One disadvantage of the piezoelectric plates are the electrical cables that are necessary to bring power to them. These cables are woundable to electrical lightning and can easily be damaged in case of a lightning strike.

Another proposal, disclosed in U.S. Pat. No. 6,769,873, relates to a dynamically reconfigurable wind turbine blade assembly including a plurality of reconfigurable blades mounted on a hub, an actuator fixed to each of the blades and adapted to effect the reconfiguration thereof, and an actuator power regulator for regulating electrical power supplied to the actuators.

None of these proposals produces fully satisfactory results, therefore a continuing need exists for wind turbines having rotor blades with means for reducing the blade loads.

SUMMARY OF THE INVENTION

An object of the invention is to provide a wind turbine that, in addition to a pitch system, has special means for achieving an accurate control of the blade loads.

Another object of the invention is to provide a wind turbine having means for controlling the changes in the flow and hence optimizing the whole rotor performance and minimizing the pitch activity of the blades.

These and other objects of the present invention are met by providing a wind turbine with rotor blades comprising a first component having an aerodynamic profile with a leading edge, a trailing edge and suction and pressure sides between the leading edge and the trailing edge and a second component, attached to the trailing edge and/or to the leading edge of the first component in at least a part of the blade, which comprises an upwards and/or downwards deflectable flap that allows changing the flow over the blade, and means for deflecting the flap including a stiff plate inserted between the first component and the flap and stiff plate actuating means.

In a preferred embodiment, the stiff plate actuating means are vacuum and/or pressure operable chambers/tubes located in the first component. The flap deflection is controlled by load measurements on the blade, velocity or pressure measurements of the air on the blade or lidar measurements of the flow in front of the blade. With the load feed back and the appropriate control algorithm the flap can be used to control the blade loading more accurate than in the prior art. Hereby "active" controlled deflectable flaps are achieved.

Other features and advantages of the present invention will be understood from the following detailed description in relation with the enclosed drawings.

DETAILED DESCRIPTION OF PREFERRED EMBODIMENTS

Figure 1:
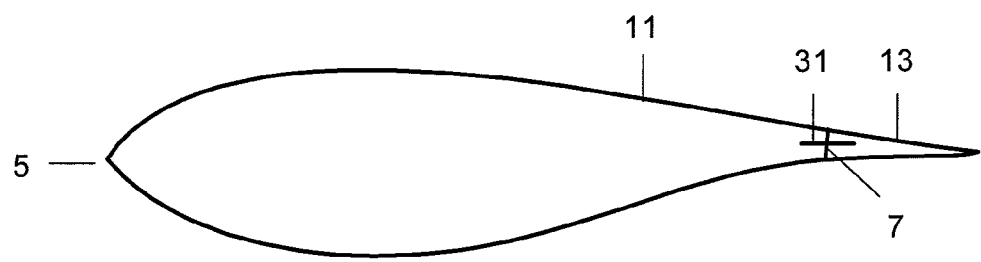
FIG. 1 is a schematic cross sectional view of a wind turbine blade according to the present invention showing the second component attached to the trailing edge of the first component.

FIG. 1 shows the second component 13 attached to the first component 11 of a wind turbine blade according to the present invention.

The first component 11 has a typical aerodynamic profile with a leading edge 5, a trailing edge 7 and suction and pressure sides between the leading edge 5 and the trailing edge 7.

The following detailed description will refer to embodiments of the invention in which the second component 13 is attached to the trailing edge 7 of the first component 11. The invention also comprises embodiments in which the second component 13 is similarly attached to the leading edge 5 of the first component 11.

The second component 13 includes a deflectable flap 15 by means of displacements of a stiff plate 31 inserted between the first component 11 and the flap 15 which can be actuated in different manners as it will be now explained.

Figure 2:
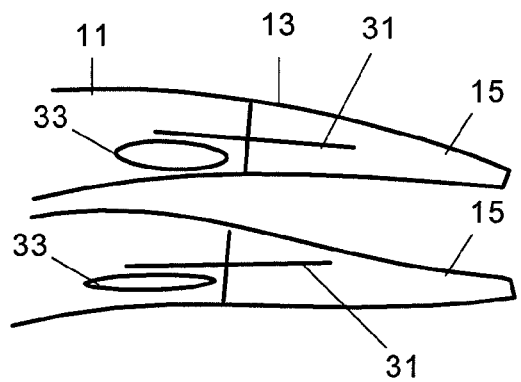
FIG. 2 is a schematic cross sectional partial view of a wind turbine blade according to a first embodiment of the present invention showing the second component attached to the trailing edge of the first component.

A first embodiment of the present invention is shown in FIG. 2. The second component 13 is a deflectable flap 15 by means of a stiff plate 31 inserted between the first component 11 and the flap 15, which is actuated by a vacuum operable inner chamber 33 located at the first component 11.

Within this invention the term "chamber" shall be understood in a broad sense as a body of a variable volume under pressure or vacuum for an upwards or downwards displacement of the side of the stiff plate 31 placed inside the first component 11 of the blade.

Figure 3:
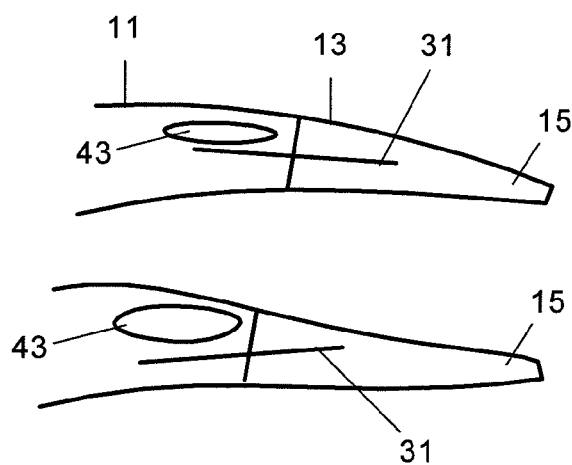
FIG. 3 is a schematic cross sectional partial view of a wind turbine blade according to a second embodiment of the present invention showing the second component attached to the trailing edge of the first component.

A second embodiment of the present invention is shown in FIG. 3. The second component 13 is a deflectable flap 15 by means of a stiff plate 31 inserted between the first component 11 and the flap 15, which is actuated by a pressure operable inner chamber 43 located at the first component 11.

Figure 4:
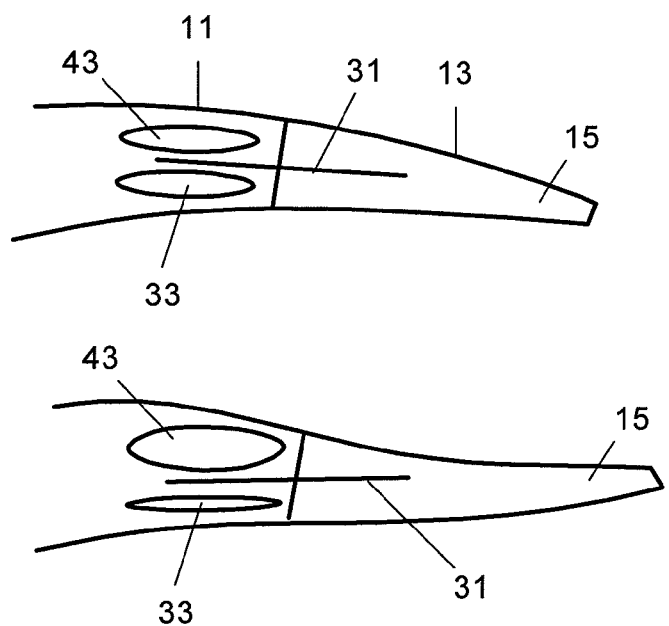
FIG. 4 is a schematic cross sectional partial view of a wind turbine blade according to a third embodiment of the present invention showing the second component attached to the trailing edge of the first component.

A third embodiment of the present invention is shown in FIG. 4. The second component 13 is a deflectable flap 15 by means of a stiff plate 31 inserted between the first component 11 and the flap 15, which is actuated by a vacuum operable inner chamber 33 and a pressure operable chamber 43 located at the first component 11.

Pressure/vacuum applied with a fluid or gas medium in above mentioned chambers 33, 43 is scaled to give a defined force over the stiff plate 31 resulting in a change of the relative position of the flap 15 with respect to the first component 11.

The wind turbine also comprises computer means for controlling the actuating means 33, 43 that deflect the flap 15 in a full active load control mode, taking into account load measurements on the blade and relevant airflow parameters provided by relevant sensors or in a semi active load control mode taking into account the overall turbine conditions (without specific sensor information).

The flap 15 is made in one piece of a flexible material such as rubber and it is attached to the first component 11 with means allowing its deflection as explained above. It can also be made as a pultruded profile eg. in glass fiber reinforced composite material.

Figure 5:
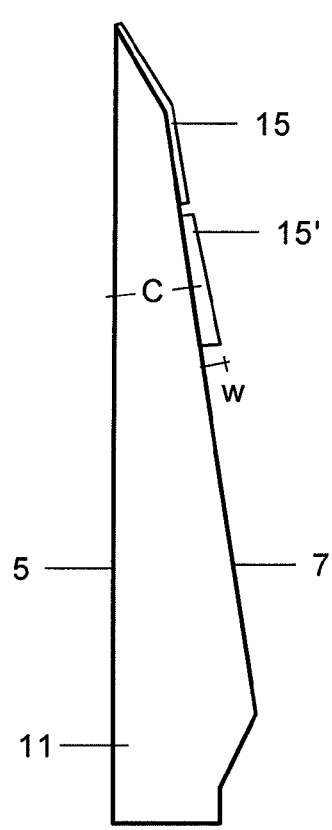
FIG. 5 is a schematic sectional view of a wind turbine blade incorporating a deflectable flap according to the present invention.
Figure 6:
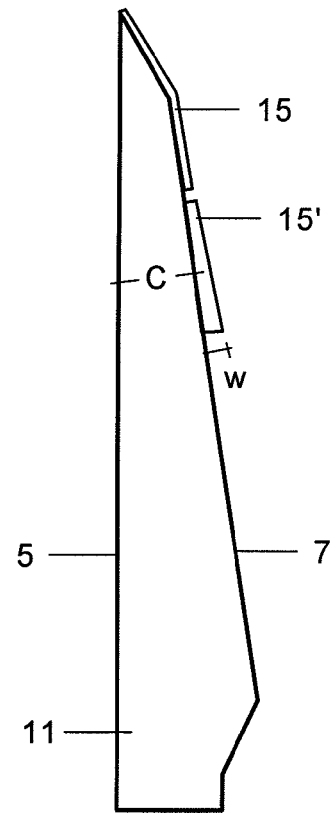
FIG. 6 is a schematic sectional view of a wind turbine blade incorporating two deflectable flaps according to the present invention.

The blade may include one individual flap 15 as shown in FIG. 5 or several flaps 15, 15' as shown in FIG. 6. In the latter case each flap 15, 15' has its own actuating means.

In a preferred embodiment, the width W of the flap or flaps 15, 15' is comprised between 1-20% of the chord length C in the center of the flap.

The width W of the flap or flaps 15, 15' may be constant or variable. In the first case the width will be usually smaller close to the tip region and larger towards the root section of the blade. In the latter case, the width W of the flap 15', as shown in FIG. 6 will decrease towards the tip of the blade.

In another preferred embodiment, the flap or flaps 15, 15' are attached to the blade leading edge 5 and/or to the blade trailing edge 7 in a section having a length lesser than ⅓ of the blade length L.

Although the present invention has been fully described in connection with preferred embodiments, it is evident that modifications may be introduced within the scope thereof, not considering this as limited by these embodiments, but by the contents of the following claims.

The invention claimed is:

1. A wind turbine having at least a blade which comprises a first component (11) having an aerodynamic profile with a leading edge (5), a trailing edge (7), and suction and pressure sides between the leading edge (5) and the trailing edge (7), and a second component (13) attached to the trailing edge (7) and/or to the leading edge (5) of the first component (11) in at least a part of the blade, wherein:
    the second component (13) comprises an upwards and/or downwards deflectable flap (15) that allows changing flow over the blade;
    the blade further comprising a means for deflecting the deflectable flap (15) which comprise a stiff plate (31) inserted between the first component (11) and the flap (15) and stiff plate actuating means (33, 43) located in the first component (11) and actuated by vacuum and/or pressure.

2. A wind turbine according to claim 1, wherein the stiff plate actuating means are vacuum operable inner chambers (33) which are located in the first component (11) close to the stiff plate (31).

3. A wind turbine according to claim 1, wherein the stiff plate actuating means are pressure operable inner chambers (43) which are located in the first component (11) close to the stiff plate (31).

4. A wind turbine according to claim 1, wherein the stiff plate actuating means are vacuum and pressure operable inner chambers (33, 43) which are located in the first component (11) close to the stiff plate (31).

5. A wind turbine according to claim 1, wherein the wind turbine also comprises means for controlling said actuating means (33, 43) depending on the wind situation and/or the loads on the blade.

6. A wind turbine according to claim 1, wherein the flap (15) is made in one piece of a flexible material.

7. A wind turbine according to claim 6, wherein the flap (15) is made of rubber.

8. A wind turbine according to claim 6, wherein the flap (15) is made of a pultruded fiber glass reinforced composite.

9. A wind turbine according to claim 1, wherein the width W of the flap (15) is comprised between 1-20% of the chord length C of the blade in the center of the flap (15).

10. A wind turbine according to claim 9, wherein the width W of the flap (15) is constant along the blade.

11. A wind turbine according to claim 9, wherein the width W of the flap (15') is variable along the blade.

12. A wind turbine according to claim 1, wherein the flap (15) is attached to the blade leading edge (5) and/or to the blade trailing edge (7) in a section having a length lesser than ⅓ of the blade length L.

13. A wind turbine according to claim 1, wherein the blade includes one or several second components (13) having each of them an individual flap (15, 15') with individual stiff plate actuating means (33, 43).

* * * * *